(12) United States Patent
Kiuchi et al.

(10) Patent No.: US 9,321,011 B2
(45) Date of Patent: Apr. 26, 2016

(54) ETHANOL/WATER VAPOR PERMEATION MEMBRANE SEPARATION PROCESS WITH HEAT AND ENERGY RECOVERY VIA TEMPERATURE AND FLOW CONTROL

(75) Inventors: Takafumi Kiuchi, Fukuoka (JP); Ryohta Hidaka, Fukuoka (JP); Yoichi Ishibashi, Fukuoka (JP); Yasuki Kansha, Tokyo (JP); Atsushi Tsutsumi, Tokyo (JP)

(73) Assignees: NIPPON STEEL & SUMKIN ENGINEERING CO., LTD., Tokyo (JP); THE UNIVERSITY OF TOKYO, Tokyo (JP)

( * ) Notice: Subject to any disclaimer, the term of this patent is extended or adjusted under 35 U.S.C. 154(b) by 90 days.

(21) Appl. No.: 13/809,445

(22) PCT Filed: Jul. 29, 2011

(86) PCT No.: PCT/JP2011/004306
§ 371 (c)(1),
(2), (4) Date: Mar. 5, 2013

(87) PCT Pub. No.: WO2012/017628
PCT Pub. Date: Feb. 9, 2012

(65) Prior Publication Data
US 2013/0153498 A1 Jun. 20, 2013

(30) Foreign Application Priority Data
Aug. 5, 2010 (JP) ................................ 2010-176499

(51) Int. Cl.
*B01D 61/36* (2006.01)

(52) U.S. Cl.
CPC ............ *B01D 61/362* (2013.01); *B01D 61/368* (2013.01); *B01D 2313/24* (2013.01); *B01D 2313/246* (2013.01); *B01D 2313/38* (2013.01)

(58) Field of Classification Search
CPC ........ B01D 53/22; B01D 53/61; B01D 61/00; B01D 61/36; B01D 61/362; B01D 61/364; B01D 61/368; B01D 63/02; B01D 69/125; B01D 71/00; B01D 71/02; B01D 71/64; B01D 2313/24; B01D 2313/38; B01D 2313/246; B01J 19/00; C02F 1/02; C07C 29/76; C07C 27/28; C07C 29/88; C10G 31/11; C10G 33/06; C10G 45/02
USPC ............. 165/47, 50, 55, 103, 104.19, 104.22, 165/104.34, 108, 218, 297, 299; 202/185.1; 210/180, 321.79, 321.8, 637, 640, 916
See application file for complete search history.

(56) References Cited

U.S. PATENT DOCUMENTS 4,911,845 A * 3/1990 Hashimoto et al. ........... 210/640
6,035,932 A * 3/2000 Goeler et al. .................. 165/297
(Continued)

FOREIGN PATENT DOCUMENTS

| CN | 101709237 | 5/2010 |
|---|---|---|
| JP | 7-227517 | 8/1995 |
| JP | 2010-36056 | 2/2010 |
| WO | 2009/048335 | 4/2009 |

OTHER PUBLICATIONS

JP2010-036056 Matsuda et al.—Heating and Cooling Module [Abstract & Machine Translation; Feb. 18, 2010].*
International Search Report issued Oct. 25, 2011 in International (PCT) Application No. PCT/JP2011/004306.
International Preliminary Report on Patentability issued Mar. 12, 2013 in International Application No. PCT/JP2011/004306.

*Primary Examiner* — Dirk Bass
*Assistant Examiner* — Hayden Brewster
(74) *Attorney, Agent, or Firm* — Wenderoth, Lind & Ponack, L.L.P.

(57) ABSTRACT

[Problem] To provide a membrane separation apparatus and a membrane separation method capable of reducing energy consumption,
[Solution] A membrane separation apparatus (10) includes: a membrane separator (20) supplied with a fluid (X) containing a component (A) and a component (B) and separating the fluid (X) into a fluid (Y) having a higher concentration of the component (A) than the fluid (X) and a fluid (Z) having a lower concentration of the component (A) than the fluid (X) by using a separation membrane; a first compressor (21) adiabatically compressing the fluid (Y); a first heat exchanger (11) to which the fluid (Y) adiabatically compressed by the first compressor (21) is introduced as a heat source; and a second heat exchanger (12) to which the fluid (Z) is introduced as a heat source. The fluid (X) is divided and conveyed by first and second supply lines (31, 32), the divided fluids (X) are heated by the first and second heat exchangers (11, 12), respectively, then merged and supplied to the membrane separator (20).

5 Claims, 10 Drawing Sheets

(56) References Cited

U.S. PATENT DOCUMENTS

| | | |
|---|---|---|
| 2003/0232224 A1* | 12/2003 | Kordesch et al. ............... 429/17 |
| 2004/0103637 A1* | 6/2004 | Maisotsenko et al. ....... 60/39.59 |
| 2004/0211726 A1* | 10/2004 | Baig et al. .................... 210/640 |
| 2008/0207959 A1* | 8/2008 | Plante et al. .................. 568/916 |
| 2011/0152584 A1* | 6/2011 | Pasanen et al. ............... 568/916 |
| 2011/0201699 A1* | 8/2011 | Lucas et al. ................... 518/702 |
| 2012/0100062 A1* | 4/2012 | Nakamura et al. ............ 423/359 |

* cited by examiner

ETHANOL/WATER VAPOR PERMEATION MEMBRANE SEPARATION PROCESS WITH HEAT AND ENERGY RECOVERY VIA TEMPERATURE AND FLOW CONTROL

FIELD

The present invention relates to a membrane separation apparatus and a membrane separation method for separating a fluid by using a separation membrane.

BACKGROUND

Patent Document 1 describes a heating module having a unit operation section, a heat exchanger, and a compressor provided between an output side of the unit operation section and the heat exchanger.

The unit operation section outputs an output fluid produced from an input fluid by means of unit operation. The outputted output fluid is compressed by the compressor. The input fluid is heat-exchanged with the output fluid having been compressed by means of the heat exchanger. Here, a membrane separator is given as an example of the unit operation section.

CITATION LIST

Patent Document

Patent Document 1: Japanese Patent Application Laid-open No. 2010-36056 (p. 9, FIG. 1(c))

SUMMARY

Technical Problem

A membrane separator generally outputs two types of fluids, i.e., a fluid that does not permeate a separation membrane and a fluid that permeates the separation membrane.

In the technique described in Patent Document 1, however, there is only one output fluid from this unit operation section (membrane separator) and there is no reference to the remaining fluid.

An object of the present invention is to provide a membrane separation apparatus and a membrane separation method capable of heating a fluid X supplied to a membrane separator by utilizing fluids Y and Z outputted from a non-permeated side and a permeated side of the membrane separator, respectively, so as to reduce energy consumption in the apparatus as a whole.

Solution to Problem

A membrane separation apparatus according to a first invention in accordance with the above-described object includes: a membrane separator supplied with a fluid X containing a component A and a component B and separating the fluid X into a fluid Y having a higher concentration of the component A than the fluid X and a fluid Z having a lower concentration of the component A than the fluid X by using a separation membrane;
　a first compressor adiabatically compressing the fluid Y exiting from the membrane separator;
　a first heat exchanger to which the fluid Y adiabatically compressed by the first compressor is introduced as a heat source; and
　a second heat exchanger to which the fluid Z is introduced as a heat source, wherein
　the fluid X is divided and conveyed by a first supply line and a second supply line, and the fluids X conveyed by the first and second supply lines are heated by the first and second heat exchangers, respectively, then merged again and supplied to the membrane separator.

The membrane separation apparatus according to the first invention may further include a second compressor between the membrane separator and the second heat exchanger, the second compressor adiabatically compressing the fluid Z exiting from the membrane separator, and the fluid Z adiabatically compressed by the second compressor may be introduced into the second heat exchanger.

A membrane separation apparatus according to a second invention in accordance with the above-described object includes: a membrane separator supplied with a fluid X containing a component A and a component B and separating the fluid X into a fluid Y having a higher concentration of the component A than the fluid X and a fluid Z having a lower concentration of the component A than the fluid X by using a separation membrane;
　a second compressor adiabatically compressing the fluid Z exiting from the membrane separator;
　a first heat exchanger to which the fluid Y exiting from the membrane separator is introduced as a heat source; and
　a second heat exchanger to which the fluid Z adiabatically compressed by the second compressor is introduced as a heat source, wherein
　the fluid X is divided and conveyed by a first supply line and a second supply line, and the fluids X conveyed by the first and second supply lines are heated by the first and second heat exchangers, respectively, then merged again at a merging point where the first supply line and the second supply line are merged, adiabatically compressed by a third compressor provided between the merging point and the membrane separator, and supplied to tire membrane separator.

The membrane separation apparatus according to the second invention may further include an expander between the membrane separator and the first heat exchanger.

The membrane separation apparatuses according to the first and second inventions may further include: a first valve adjusting a flow rate of the fluid X flowing through the first supply line; and
　a control device operating the first valve, and
　if a temperature difference $\Delta T2$ between the fluid X heated by the second heat exchanger and the fluid Z to be introduced into the second heat exchanger as a heat source is equal to or greater than a reference value $TS2$,
　the control device may adjust a degree of opening in the first valve on the basis of a difference between the temperature difference $\Delta T2$ and the reference value $TS2$ so as to control an amount of heat to be exchanged at the second heat exchanger.

The membrane separation apparatuses according to the first and second inventions may further include a second valve adjusting a flow rate of the fluid X flowing through the second supply line, and
　if a temperature difference $\Delta T1$ between the fluid X heated by the first heat exchanger and the fluid Y to be introduced into the first heat exchanger as a heat source is equal to or greater than a reference value $TS1$,
　the control device may adjust a degree of opening in the second valve on the basis of a difference between the temperature difference $\Delta T1$ and the reference value $TS1$ so as to control an amount of heat to be exchanged at the first heat exchanger.

In the membrane separation apparatuses according to the second inventions, the reference values TS1 and TS2 each are preferably in a range between 2 and 50° C.

The membrane separation apparatuses according to the first and second inventions may further include an inverter driving the second compressor, and the inverter may control a number of locations in the second compressor so that a pressure of the fluid Z exiting from the membrane separator falls within a predetermined range.

The membrane separation apparatuses according to the first and second inventions may further include a third heat exchanger between the membrane separator and a merging point where the first supply line and the second supply line are merged, the third heat exchanger adjusting a temperature of the fluid X by an external heat source.

The membrane separation apparatus according to the second invention may further include, between the merging point and the third compressor, a superheater employing, as a heat source, the fluid X compressed by the third compressor and heating the fluid X merged at the merging point; and a cooler adjusting a temperature of the fluid X heated by the superheater, and the fluid X to enter into the third compressor may be subjected to temperature adjustment by the cooler after being heated by the superheater.

The membrane separation apparatus according to the second invention may include a bypass line capable of connecting between an inlet side of the superheater for a fluid to be heated and an outlet side thereof for a heating fluid for heating the fluid to be heated, and upon start-up of the membrane separation apparatus, the inlet side and the outlet side are preferably connected by the bypass line so that air or an inert gas is circulated between the superheater and the third compressor.

The membrane separation apparatus according to the first invention may further include a heater between the membrane separator and the second heat exchanger, the heater employing an external vapor as a heat source, and the fluid Z may be subjected to a temperature increase and a pressure increase by the heater and the fluid Z having been subjected to the temperature increase and the pressure increase may be introduced into the second heat exchanger.

In the membrane separation apparatuses according to the first and second inventions, each of the fluid Y and the fluid Z is preferably a gas, and the separation membrane is preferably a zeolite membrane or a polyimide membrane.

In the membrane separation apparatuses according to the first and second inventions, the component A is preferably ethanol, and the component B is preferably water.

A membrane separation method according to a third invention in accordance with the above-described object includes: a step α of separating a fluid X containing a component A and a component B into a fluid Y having a higher concentration of the component A than the fluid X and a fluid Z having a lower concentration of the component A than the fluid X by using a membrane separator; and a step β of subjecting the fluid Y separated by the step α to a temperature increase and a pressure increase, wherein the fluid X is divided and conveyed by a first supply line and a second supply line, and the fluids X conveyed by the first and second supply lines are heated by heat exchanges with the fluid Y having been subjected to the temperature increase and the pressure increase in the step β and the fluid Z exiting from the membrane separator, then merged again, and supplied to the membrane separator.

The membrane separation method according to the third invention may further include a step γ of subjecting the fluid Z exiting from the membrane separator to a temperature increase and a pressure increase, and the fluid X divided into the second supply line may be heated by heat exchange with the fluid Z having been subjected to the temperature increase and the pressure increase.

A membrane separation method according to a fourth invention in accordance with the above-described object includes; a step α of separating a fluid X containing a component A and a component B into a fluid Y having a higher concentration of the component A than the fluid X and a fluid Z having a lower concentration of the component A than the fluid X by using a membrane separator;

a step ε of expanding the fluid Y separated by the step α; and a step γ of subjecting the fluid Z separated by the step α to a temperature increase and a pressure increase, wherein the fluid X is divided and conveyed by a first supply line and a second supply line, and the fluids X conveyed by the first and second supply lines are heated by heat exchanges with the fluid Y having been expanded by the step ε and the fluid Z having been subjected to the temperature increase and the pressure increase by the step γ, respectively, then merged again, adiabatically compressed, and supplied to the membrane separator.

Advantageous Effects of Invention

In the membrane separation apparatuses according to embodiment 1 and its dependent embodiments 2 and 5 to 14, heat is recovered from the fluids Y and Z exiting from the membrane separator by means of the first and second heat exchangers provided in parallel. As a result, the energy consumption thereof can be reduced as compared to a case without the configuration of the present invention.

In the membrane separation apparatuses according to embodiment 3 and its dependent embodiments 4 to 14, the driving force thereof is increased, thereby making it possible to reduce the necessary area of the separation membrane.

In the membrane separation apparatus according to embodiment 4, the provision of the expander makes it possible to recover the expansion energy as a motive power in a process of turning the high-pressure fluid Y exiting from the membrane separator into a low-pressure fluid.

In the membrane separation apparatuses according to embodiments 5 to 7, simply by providing the valves, the amounts of heat to be exchanged at the heat exchangers can be easily controlled on the basis of the temperatures of the fluids.

In the membrane separation apparatus according to embodiment 8, since the pressure of the fluid Z exiting from the membrane separator is kept within the predetermined range, it is possible to keep the driving force within a predetermined range.

In the membrane separation apparatus according to embodiment 9, since the third heat exchanger suppresses a variation in supply conditions for the fluid X, the membrane separation apparatus can be operated in a stable manner.

In the membrane separation apparatuses according to embodiments 10 and 11, since the fluid X is heated by the superheater, the condensation of the fluid X does not occur. As a result, it is possible to prevent a damage in the third compressor.

In the membrane separation apparatus according to embodiment 12, the motive power for a motor can be covered by the motive power of vapor heat.

In the membrane separation methods according to embodiments 15 and 16, heat is recovered from the separated fluids Y and Z. As a result, the energy consumption thereof can be reduced as compared to a case without employing the method of the present invention.

In the membrane separation method according to embodiment 17, by providing the step ε of expanding the fluid Y, the expansion energy can be recovered as a motive power in a process of turning the high-pressure fluid Y having been subjected to the step α into a low-pressure fluid.

DESCRIPTION OF EMBODIMENTS

Embodiments embodying the present invention will now be described with reference to the accompanying drawings in order to facilitate the understanding of the present invention. Note, however, that the technical scope of the present invention is not limited by the following embodiments.

Figure 1:
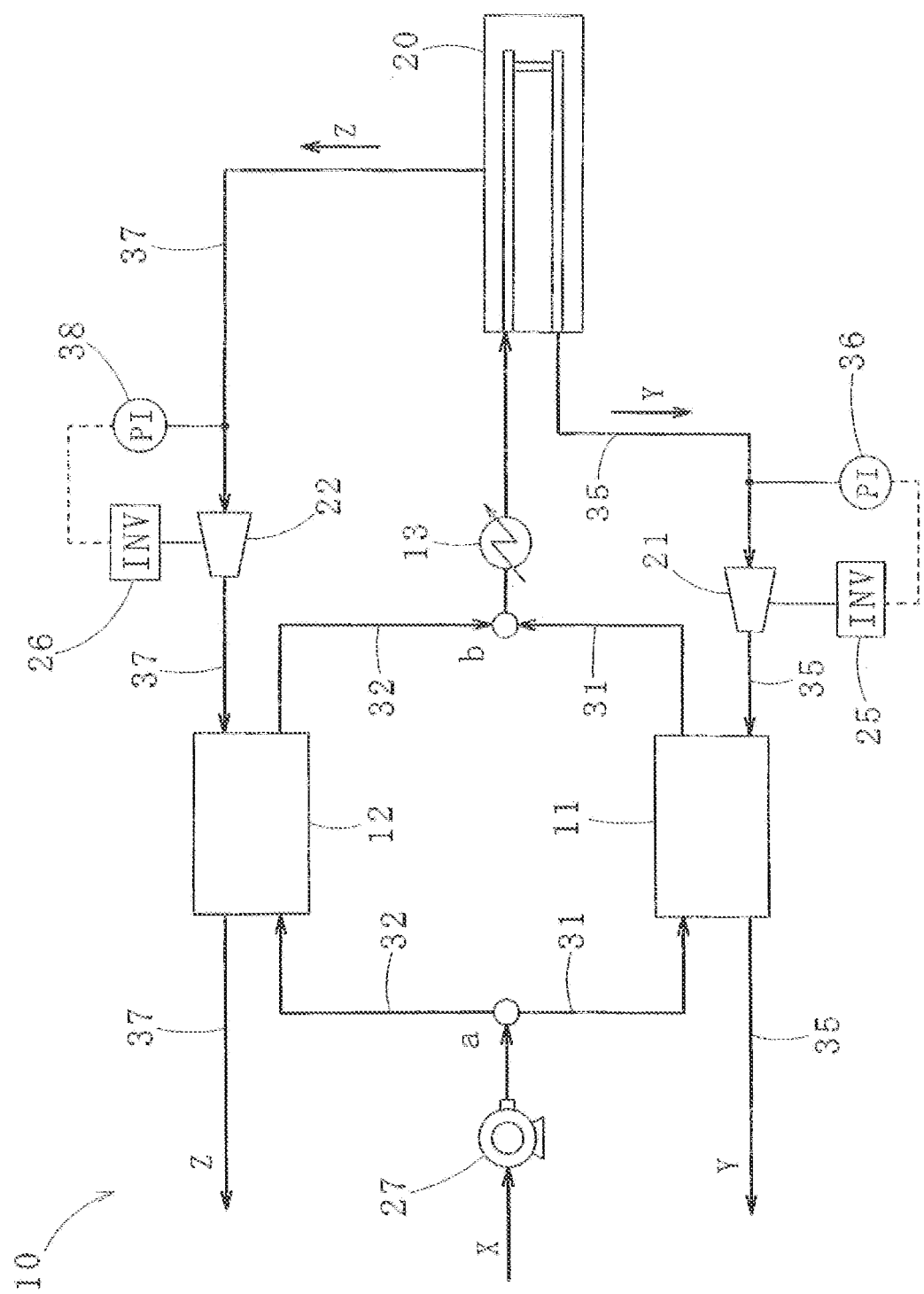
FIG. 1 is a configuration diagram of a membrane separation apparatus according to a first embodiment of the present invention.

As shown in FIG. 1, a membrane separation apparatus 10 according to the first embodiment of the present invention can separate an ethanol mixed liquid in which ethanol (an example of a component A) supplied from outside and water (an example of a component B) are mixed together into ethanol having a higher concentration and water. The membrane separation apparatus 10 includes: a first heat exchanger 11; a second heat exchanger 12; a third heat exchanger 13; a membrane separator 20; a first compressor 21; and a second compressor 22. The membrane separator 20, the first compressor 21, the first heat exchanger 11, the second compressor 22, the second heat exchanger 12, and the third heat exchanger 13 will be described below in this order.

The membrane separator 20 can separate, by means of a vapor permeation (vapor vaporation) method, a supplied vapor of the ethanol mixed liquid (hereinafter referred to simply as an "ethanol mixed vapor") into a vapor having a higher ethanol concentration (an example of a fluid Y, hereinafter referred to simply as an "ethanol vapor") and a vapor having a lower ethanol concentration (an example of a fluid Z, hereinafter referred to simply as a "water vapor"). For example, the membrane separator 20 can separate an ethanol mixed vapor having an ethanol concentration of 85.7 wt % into an ethanol vapor having an ethanol concentration of 99.5 wt % and a water vapor having an ethanol concentration of 13.0 wt %.

The membrane separator 20 includes a separation membrane provided a plurality of membrane modules stored in a casing. This separation membrane is a zeolite membrane or a polyimide membrane, for example. The separation membrane has a property more likely to allow the permeation of water and less likely to allow the permeation of ethanol. The membrane separator 20 can separate the ethanol mixed vapor into the ethanol vapor and the water vapor by utilizing such a property and by using a pressure difference between an inlet side and an outlet side of the membrane separator 20 as a driving force.

The first compressor 21 can adiabatically compress the ethanol vapor exiting from the membrane separator 20. The rotation rate of the first compressor 21 is controlled by an inverter 25.

The first heat exchanger 11 can heat the ethanol mixed liquid supplied by a pump 27. The heated ethanol mined liquid is earned into an ethanol mixed vapor. The first heat exchanger 11 utilizes the ethanol vapor having been adiabatically compressed by the first compressor 21 as a heat source. Note that each of the ethanol mixed vapor and the ethanol mixed liquid is an example of the fluid X.

The second compressor 22 can adiabatically compress the water vapor exiting from the membrane separator 20. The rotation rate of the second compressor 22 is controlled by an inverter 26.

The second heat exchanger 12 can heat the ethanol mixed liquid supplied by the pump 27. The heated ethanol mixed liquid is turned into an ethanol mixed vapor. The second heat exchanger 12 utilizes the water vapor having been adiabatically compressed by the second compressor 22 as a heat source. Although the first and second heat exchangers 11 and 12 are configured as separate units, they may be integrated together.

The third heat exchanger 13 can adjust a temperature of the ethanol mixed vapor heated by the first and second heat exchanges 11 and 12. The third heat exchanger 13 uses, as a heat source, an external vapor supplied from a vapor line (not shown) (an example of an external heat source).

Operations of the membrane separation apparatus 10 will be described next.

The ethanol mixed liquid is sent out by the pump 27, and is divided into a first supply line 31 and a second supply line 32 at a branch point a and conveyed. The ethanol mixed liquid conveyed through the first supply line 31 is heated by the first heat exchanger 11. The ethanol mixed liquid heated by the first heat exchanger 11 is turned into the ethanol mixed vapor and conveyed further downstream.

In a similar manner, the ethanol mixed liquid conveyed through the second supply line 32 is heated by she second heat exchanger 12. The ethanol mixed liquid heated by the second heat exchanges 12 is also turned into the ethanol mixed vapor and conveyed further downstream.

The ethanol mixed vapors conveyed respectively by the first supply line 31 and the second supply line 32 are merged again at a merging paint b. The merged ethanol mixed vapor is subjected to temperature adjustment by the third heat exchanger 13 and then supplied to the membrane separator 20. Here, when a supply condition such as the temperature of the ethanol mixed vapor is varied, the third heat exchanger 13 serves to suppress such a variation. For example, if a flow rate of the ethanol mixed liquid is varied and the temperatures of the ethanol mixed vapors exiting from the first and second heat exchangers 11 and 12 are decreased below predetermined temperature, the third heat exchanger 13 increases the heat exchange amount thereof so as to increase she temperature of she ethanol mixed liquid. In this manner, it is possible with she third heat exchanger 13 to operate the membrane separation apparatus 10 in a stable manner even when the flow rate of the supplied ethanol mixed liquid is varied. Moreover, since the ethanol mixed liquid is not heated sufficiently by the first and second heat exchangers 11 and 12 upon the start-up of the membrane separation apparatus 10, the third heat exchanger 13 can cover the insufficient heating, thereby enabling the stable operation of the membrane separation apparatus 10.

The ethanol mixed vapor supplied to the membrane separator 20 is separated into the ethanol vapor and the water vapor by means of the separation membrane.

The ethanol vapor exiting from the membrane separator 20 is conveyed through a non-permeated side line 35 and adiabatically compressed by the first compressor 21. Here, the first compressor 21 is driven by the inverter 25 as described above. The inverter 25 operates in accordance with an output value of a pressure sensor 36 for measuring a pressure of the ethanol vapor exiting from the membrane separator 20. Specifically, the inverter 25 controls the number of rotations in the first compressor 21 so that the output value of the pressure sensor 36 is fed back and the pressure of the ethanol vapor falls within a predetermined range. Accordingly, the pressure in the non-permeated side line 35 is kept within the predetermined range.

The ethanol vapor adiabatically compressed by the first compressor 21 is subjected to a temperature increase and a pressure increase, enters into the first heat exchanger 11, and is heat-exchanged with the ethanol mixed liquid flowing through the first supply line 31. The ethanol vapor is condensed at the first heat exchanger 11 to be a condensed ethanol liquid.

On the other hand, the water vapor exiting from the membrane separator 20 is conveyed through a permeated side line 37 and adiabatically compressed by the second compressor 22. Here, the second compressor 22 is driven by the inverter 26 as described above. The inverter 26 operates in accordance with an output value of a pressure sensor 38 for measuring a pressure of the water vapor exiting from the membrane separator 20. Specifically, the inverter 26 controls the number of rotations in the second compressor 22 so that the output value of the pressure sensor 38 is fed back and the pressure of the water vapor falls within a predetermined range. Accordingly, the pressure in the permeated side line 37 is kept within the predetermined range. As a result, a driving force for membrane separation is kept within a predetermined range.

The water vapor adiabatically compressed by the second compressor 22 is subjected to a temperature increase and a pressure increase, enters into the second heat exchanger 12, and is heat-exchanged with the ethanol mixed liquid flowing through the second supply line 32.

As described above, the ethanol mixed liquids are efficiently heat-exchanged with the ethanol vapor and the water vapor having exited from the membrane separator 20 and then been compressed by the first and second heat exchangers 11 and 12 provided in parallel, respectively. Thus, energy consumption in the membrane separation apparatus 10 is reduced as compared to a conventional technique. Although the membrane separation apparatus can be configured by the first and second heat exchangers 11 and 12 provided in series, the heat exchange efficiency thereof is reduced as compared to the case where the first and second heat exchangers 11 and 12 are provided in parallel. Therefore, the present embodiment having the first and second heat exchangers 11 and 12 provided in parallel is more preferable.

Next, a membrane separation apparatus 40 according to the second embodiment of the present invention will be described. Constituent elements same as those in the membrane separation apparatus 10 of the first embodiment will be denoted by the same reference numerals and detailed descriptions thereof will be omitted.

Figure 2:
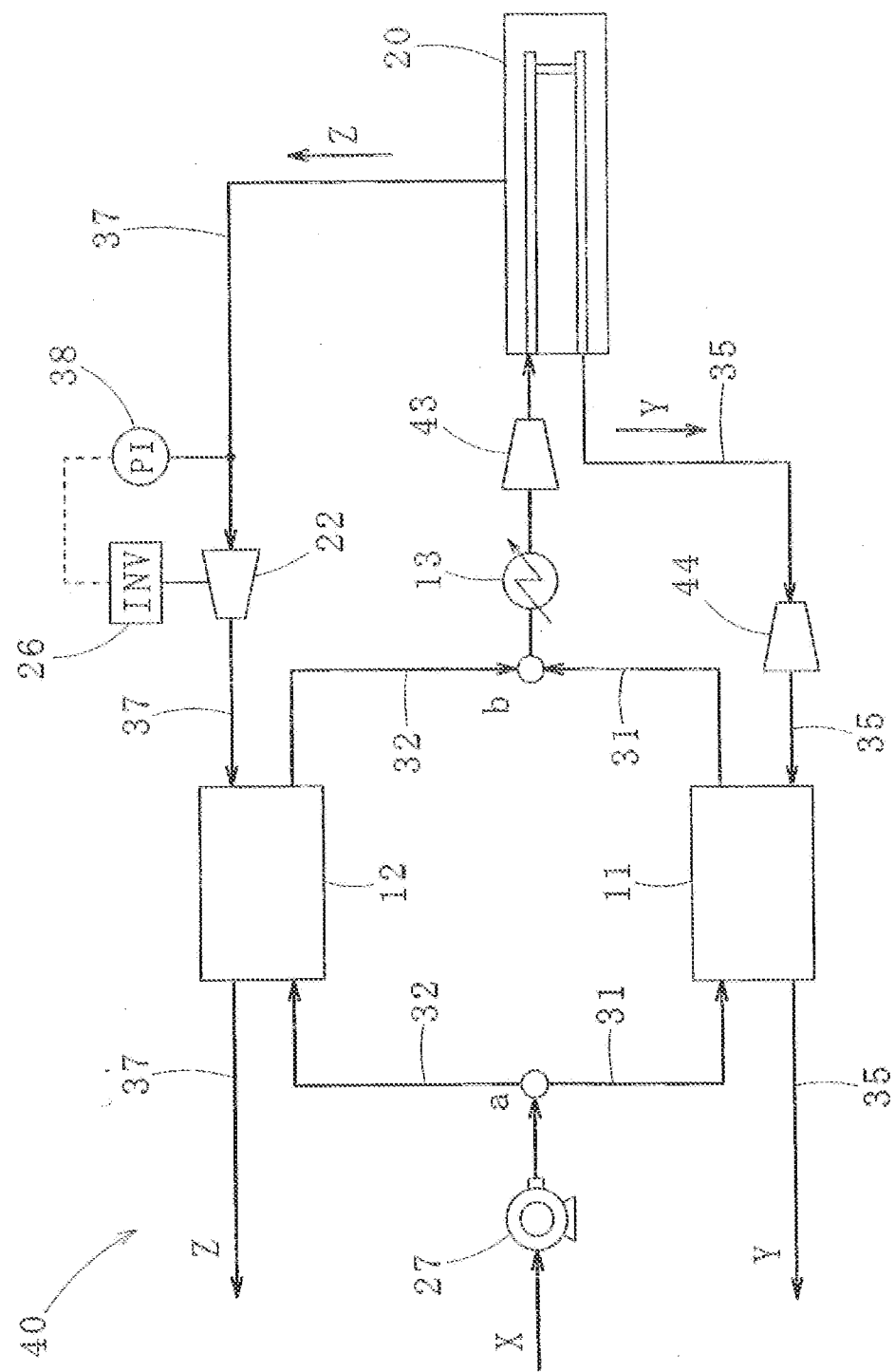
FIG. 2 is a configuration diagram of a membrane separation apparatus according to a second embodiment of the present invention.

As shown in FIG. 2, in comparison with the membrane separation apparatus 10, the membrane separation apparatus 40 according to the present embodiment further includes a third compressor 43, and includes an expander 44 instead of the first compressor 21 (as well as the pressure sensor 36 and the inverter 25 accompanied by the first compressor 21). Note, however, that the expander 44 is not essential. In other words, the membrane separation apparatus 40 according to the present embodiment may be an apparatus obtained by removing the first compressor 21 (as well as the pressure sensor 36 and the inverter 25 accompanied by the first compressor 21) from the membrane separation apparatus 10 of the first embodiment and adding the third compressor 43 to the membrane separation apparatus 10.

The third compressor 43 is provided on a downstream side of the third heat exchanger 13 between the merging point b and the membrane separator 20. The third compressor 43 can adiabatically compress the ethanol mixed vapor exiting from the third heat exchanger 13. The ethanol mixed vapor exiting from the third compressor 43 is introduced into the membrane separator 20.

The expander 44 can recover an expansion energy as a motive power in a process of turning a high-pressure ethanol vapor exiting from the membrane separator 20 into a low-pressure ethanol vapor.

The operations of the membrane separation apparatus 40 will be described next.

The ethanol mixed liquid is sent out by the pump 27, and is divided into the first supply line 31 and the second supply line 32 at the branch point a and conveyed. The ethanol mixed liquid conveyed through the first supply line 31 is heated by the first heat exchanger 11. The ethanol mixed liquid heated by the first heat exchanger 11 is turned into the ethanol mixed vapor and conveyed further downstream.

In a similar manner, the ethanol mixed liquid conveyed through the second supply line 32 is heated by the second heat exchanger 12. The ethanol mixed liquid heated by the second heat exchanger 12 is also turned into the ethanol mixed vapor and conveyed further downstream.

The ethanol mixed vapors conveyed respectively by the first supply line 31 and the second supply line 32 are merged again at the merging point b. The merged ethanol mixed vapor is subjected to temperature adjustment by the third heat exchanger 13 and then adiabatically compressed by the third compressor 43. The adiabatically compressed ethanol mixed vapor is subjected to a temperature increase and a pressure increase and then supplied to the membrane separator 20.

Operations thereafter are the same as those in the membrane separation apparatus 10 according to she first embodiment, and the description thereof will be therefore omitted.

Since the membrane separation apparatus 40 includes the third compressor 43 between the first and second heat exchangers 11,12 and the membrane separator 20 as described above, the driving force of the membrane separator 20 is increased. As a result, it is impossible to reduce the necessary area of the separation membrane as will be described below.

Generally, a gas permeation rate J [kmol·m/(s·m$^2$)] per unit membrane area with a pressure difference between a first side (inlet) and a second side (non-permeated side outlet) of the membrane separator 20 being used as a driving force (permeation driving force) is expressed by the following expression.

$$J=P*(ph-pl)/\delta \qquad \text{Expression (1)}$$

Here, P denotes a gas permeability coefficient [kmol·m/(s·m$^2$·kPa)], ph denotes a first side pressure (kPaA), pl denotes a second side pressure (kPaA), and δ denotes an effective film thickness (m).

Thus, by increasing the pressure of the ethanol mixed vapor before being introduced info the membrane separator 20 by the third compressor 43, the driving force (ph–pl) of the membrane separator is increased and the permeation rate J is therefore increased. Thus, it is possible to reduce the necessary membrane area by an amount corresponding to the increase in the permeation rate J.

For example, the membrane permeation rates in a case where the second side pressure pl is set to 13 kPaA and the first side pressure ph is increased from 101.3 kPaA to 520 kPaA are as follows from estimates based on Expression (1).

$$J1=P*(101.3-13)/\delta \qquad \text{Expression (2)}$$

$$J2=P*(520-13)/\delta \qquad \text{Expression (3)}$$

$$J1/J2=5.7 \qquad \text{Expression (4)}$$

Here, J1 denotes the gas permeation rate in a case where the first side pressure ph is set to 101.3 kPaA, and J2 denotes the gas permeation rate in a case where the first side pressure ph is set to 520 kPaA.

In other words, since the permeation rate J is increased 5.7-fold, the necessary separation membrane area can be reduced to one-5.7th.

Note that it is also possible to increase the temperature and pressure of the ethanol mixed vapor by means of a heat medium such as an external vapor instead of the use of the third compressor 43.

Next, a membrane separation apparatus 50 according to the third embodiment of the present invention will be described. Constituent elements same as those in the membrane separation apparatuses 10 and 40 of the first and second embodiments will be denoted by the same reference numerals and detailed descriptions thereof will be omitted. Although the membrane separation apparatus 50 in the present embodiment is configured on the basis of the membrane separation apparatus 40 according to the second embodiment, the membrane separation apparatus 50 can also be configured on the basis of the membrane separation apparatus 10 according to the first embodiment. Further, the membrane separation apparatus 50 can also be configured on the basis of a membrane separation apparatus 70 according to the fourth embodiment or a membrane separation apparatus 80 according to tire fifth embodiment so be described later.

Figure 3:
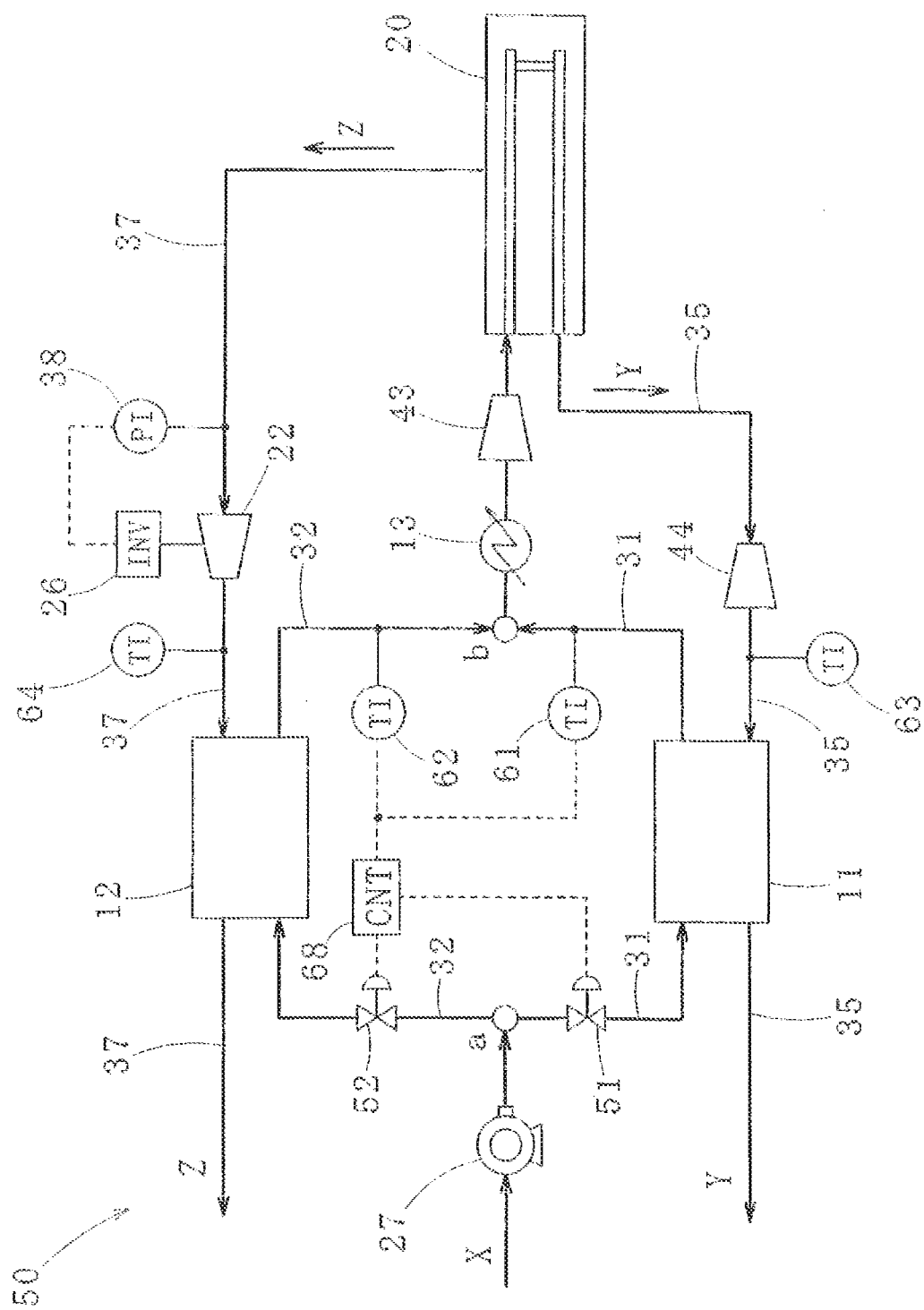
FIG. 3 is a configuration diagram of a membrane separation apparatus according to a third embodiment of the present invention.

As shown in FIG. 3, a first valve 51 is provided on the first supply line 31, and a flow rate of the ethanol mixed liquid flowing through the first supply line 31 can thereby be increased or decreased. Note that the first valve 51 may be provided alternatively as the subsequent stage of the first heat exchanger 11 as long as it is located on the first supply line 31.

Moreover, a second valve 52 is provided on the second supply line 32, and a flow rate of the ethanol mixed liquid flowing through the second supply line 32 can thereby be increased or decreased. Note that the second valve 52 may be provided alternatively at the subsequent stage of the second heat exchanger 12 as long as it is located on the second supply line 32.

Further, a first temperature sensor 61 is provided at the subsequent stage of the first heat exchanger 11 on the first supply line 31, and a temperature T1 of the ethanol mixed vapor heated by the first heat exchanger 11 can thereby be measured.

A second temperature sensor 62 is provided at the subsequent stage of the second heat exchanger 12 on the second supply line 32, and a temperature T2 of the ethanol mixed vapor heated by the second heat exchanger 12 can thereby be measured.

A third temperature sensor 62 is provided between the inlet side of the first heat exchanger 11 and the outlet side of the expander 44 on the non-permeated side line 35, and a temperature T3 of the ethanol vapor to be introduced into the first heat exchanger 11 as a heat source can thereby be measured.

A fourth temperature sensor 64 is provided between the inlet side of the second heat exchanger 12 and the outlet side of the second compressor 22 on the permeated side line 37, and a temperature T4 of the water vapor to be introduced info the second heat exchanger 12 as a heat source can thereby be measured.

Each of the measured values of the first to fourth temperature sensors 61 so 64 is inputted to a control device (CNT) 68, and degrees of opening in the first and second valves 51 and 52 can be adjusted on the basis of these measured values.

The operations of the control device 68 will be described next.

The control device 68 monitors a temperature difference ΔT1 (=T3−T1) measured by the first temperature sensor 61 and the third temperature sensor 63. The control device 68 also monitors a temperature difference ΔT2 (=T4−T2) measured by the second temperature sensor 62 and the fourth temperature sensor 64.

The first and second valves 51 and 52 are in a fully-opened state when the temperature differences ΔT1 and ΔT2 are smaller than predetermined reference values TS1 and TS2, respectively. This reference value TS may be set to, for example, 2 to 50° C., preferably 2 to 30° C., and more preferably 2 to 20° C.

However, in a case where she temperature difference ΔT1 becomes equal to or greater than the reference value TS1 due to some cause, the degree of opening in the second valve 52 is reduced, thereby reducing the flow rate of the ethanol mixed liquid flowing through the second supply line 32. As a result, more ethanol mixed liquid is allowed to flow through the first supply line 31, and more heat exchange is therefore conducted at the first heat exchanger 11.

In a case where the temperature difference ΔT2 becomes equal to or greater than the reference value TS2, on the other hand, the degree of opening in the first valve 51 is reduced, thereby reducing the flow rate of the ethanol mixed liquid flowing through the first supply line 31. As a result, more ethanol mixed liquid is allowed to flow through the second supply line 32, and more heat exchange is therefore conducted at the second heat exchanger 12.

When the temperature differences ΔT1 and ΔT2 become equal to or greater than the reference values TS1 and TS2, respectively, deviations dT1 and dT2 from the respective reference values TS1 and TS2 are obtained. Then, based on the magnitudes of the deviations dT1 and dT2, the degrees of opening in the first and second valves 51 and 52 can be reduced so as to adjust the flow rates of the ethanol mixed liquid, respectively. Specifically, the flow rate of the ethanol mixed liquid can be adjusted by reducing the degree of opening in the first valve 51 when the deviation dT2 is greater than the deviation dT1, or by reducing the degree of opening in the second valve 52 when the deviation dT2 is equal to or smaller than the deviation dT1.

As described above, based on the temperature difference ΔT1 between the ethanol mixed liquid heated by the first heat exchanger 11 and the ethanol vapor to be introduced into the first heat exchanger 11 as a heat source and the temperature difference ΔT2 between the ethanol mixed liquid heated by the second heat exchanger 12 and the water vapor to be introduced into the second heat exchanger 12 as a heat source, the control device 60 adjusts the degrees of opening in the first and second valves 51 and 52, so as to adjust the flow rates of the supplied ethanol to be heat-exchanged at the first and second heat exchangers 11 and 12. As a result, the amounts of heat exchange at the first and second heat exchangers 11 and 12 are controlled, resulting in an efficient use of the heat energies of the ethanol vapor and the water vapor. Note that the control device 68 can control the amounts of heat exchange by means of PI control, for example.

Next, the membrane separation apparatus 70 according to the fourth embodiment of the present invention will be described. Constituent elements same as those in the membrane separation apparatuses 10 and 40 of the first and second embodiments will be denoted by the same reference numerals and detailed descriptions thereof will be emitted. Although the membrane separation apparatus 70 in the present embodiment is configured on the basis of the membrane separation apparatus 40 according to the second embodiment, the membrane separation apparatus 70 can also be configured on the basis of the membrane separation apparatus 10 according to the first embodiment.

Figure 4:
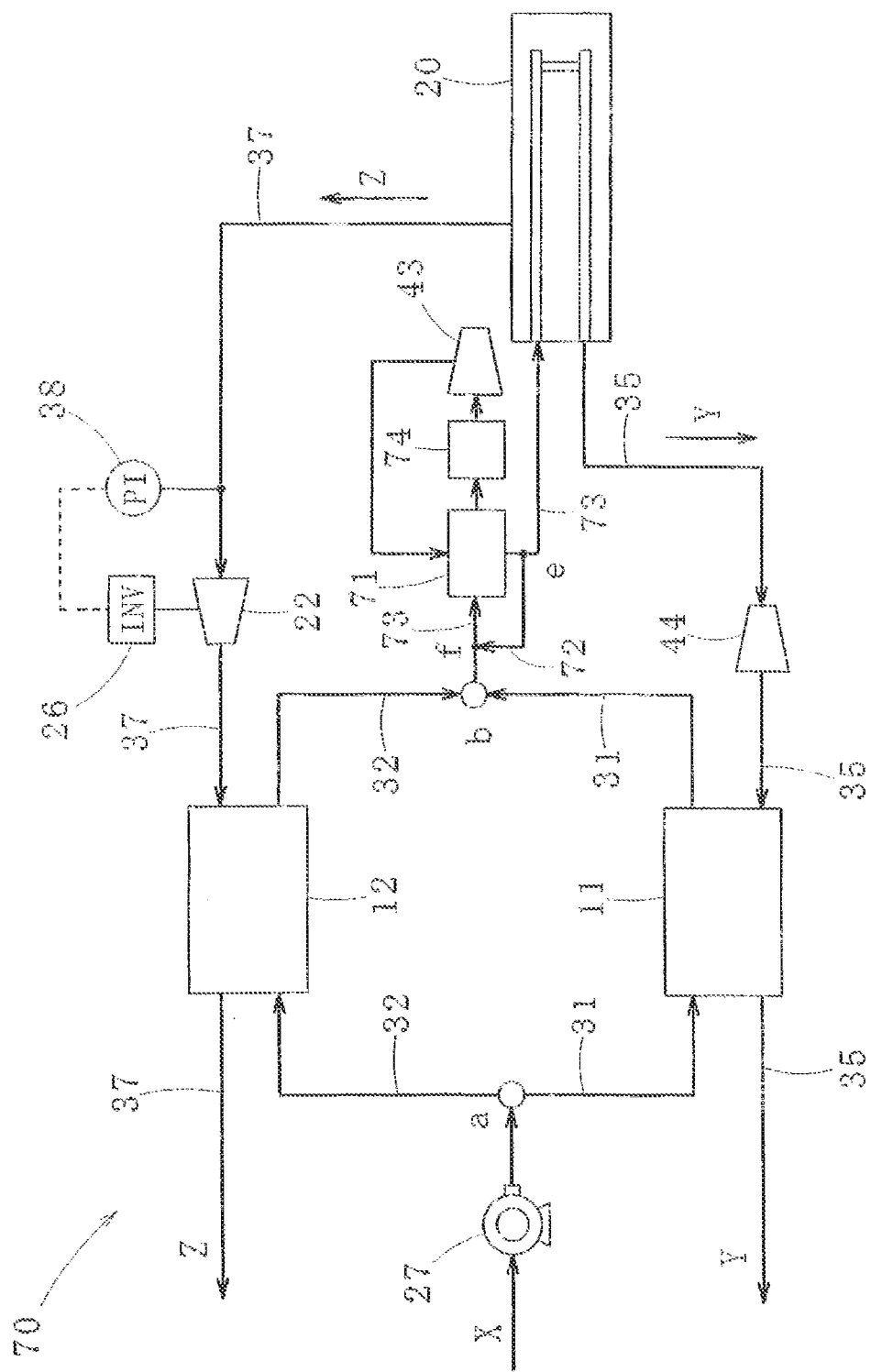
FIG. 4 is a configuration diagram of a membrane separation apparatus according to a fourth embodiment of the present invention.

As shown in FIG. 4, the membrane separation apparatus 70 includes a superheater 71 instead of the third heat exchanger 13 in the membrane separation apparatus 40 according to the second embodiment. Moreover, a cooler 74 is provided between the superheater 71 and the third compressor 43 in order to adjust the temperature of the ethanol mixed vapor.

The ethanol mixed vapors conveyed respectively by the first supply line 31 and the second supply line 32 are merged again at the merging point b. The merged ethanol mixed vapor is heated by the superheater 71, subjected to temperature adjustment by the cooler 74, and then adiabatically compressed by the third compressor 43. The adiabatically compressed ethanol mixed vapor is subjected to a temperature increase and a pressure increase to be a heat source for the superheater 71. The ethanol mixed vapor heat-exchanged at the superheater 71 is supplied to the membrane separator 20.

Since operations thereafter are the same as those in the membrane separation apparatus 40 according to the second embodiment, descriptions thereof will be omitted.

As described above, the ethanol mixed vapor to be adiabatically compressed by the third compressor 43 is heated by the superheater 71 in advance. As a result, the condensation of the ethanol mixed vapor does not occur at the inlet or inside of the third compressor 43. Thus, it is possible to prevent the mechanical damage of the third compressor 43. Further, it is possible to reduce energy loss by utilizing the ethanol mixed vapor having been subjected to a temperature increase and a pressure increase by the third compressor 43 as a heat source for the superheater 71 and self-recycling the heat energy of the ethanol mixed vapor at the superheater 71.

Here, the membrane separation apparatus 70 is provided with a bypass line 72 capable of connecting between an inlet side of the superheater 71 for a fluid to be heated (the ethanol mixed vapor merged at the merging point b) and an outlet side of the superheater 71 for a heating fluid for heating the fluid to be heated (the ethanol mixed vapor adiabatically compressed by the third compressor 43).

The bypass line 72 is used upon the start-up of the membrane separation apparatus 70.

During the steady operation thereof, the bypass line 72 is being cut off at connecting points e and f from a third supply line 73 connecting between the merging point b and the membrane separator 20.

Figure 5:
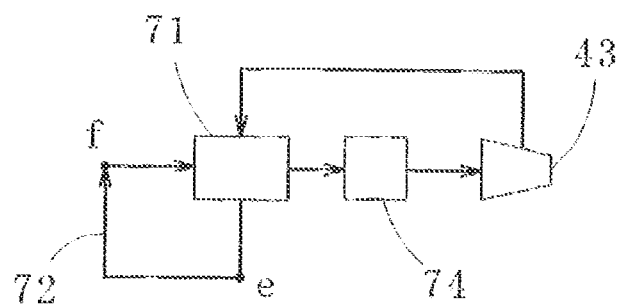
FIG. 5 is a diagram for illustrating a circulating operation of a third compressor and a superheater included in the membrane separation apparatus.

Upon the start-up of the apparatus, however, she bypass line 72 is connected to the third supply line 73 at the connecting points e and f. Further, a direction to which a fluid flows is changed at the connecting points e and f, and there is constructed a circulation line starting from the connecting point f, through the superheater 71, the cooler 74, the third compressor 43, the superheater 71, and the connecting point e, and returning again to the connecting point f (see FIG. 5).

An inert gas is filled into the circulation line from a gas supply port (not shown).

Until a predetermined amount of time T elapses since the start of the operation of the membrane separation apparatus 70, the third compressor 43 is operated so as to adiabatically compress the supplied inert gas. The inert gas is subjected to a temperature increase and a pressure increase to be a heat source for the superheater 71. Then, the superheater 71 heats the inert gas as the heat source thereof, and the heated inert gas enters into the third compressor 43 again. After the passage of the amount of time T, the bypass line 72 is cut off and the ethanol mixed vapor is flowed into the inlet side of the superheater 71 for the fluid to be heated.

By connecting the bypass line 72 to construct the circulation line and by performing the warm-up operation of the third compressor 43, it becomes possible to prevent condensation inside the third compressor 43 upon the start-up of the membrane separation apparatus 70. As a result, it is possible to prevent the damage of the third compressor 43.

In the present embodiment, although the superheater 71 is provided for the third compressor 43, the superheater can be provided similarly for the first compressor 21. Moreover, a gas which does not condense at a normal temperature (10° C. to 40° C.) (for example, air) may be used instead of the inert gas. The third heat exchanger 13 may be provided between the merging point b and the connecting point f.

Next, the membrane separation apparatus 80 according to the fifth embodiment of the present invention will be described. Constituent elements same as those in the membrane separation apparatus 10 of the first embodiment will be denoted by the same reference numerals and detailed description, thereof will be omitted. Although the membrane separation apparatus 80 in the present embodiment is configured on the basis of the membrane separation apparatus 10 according to the first embodiment, the membrane separation apparatus 80 can also be configured on the basis of the membrane separation apparatus 40 according to the second embodiment. Further, the flow rate control described in the third embodiment can also be applied thereto.

Figure 6:
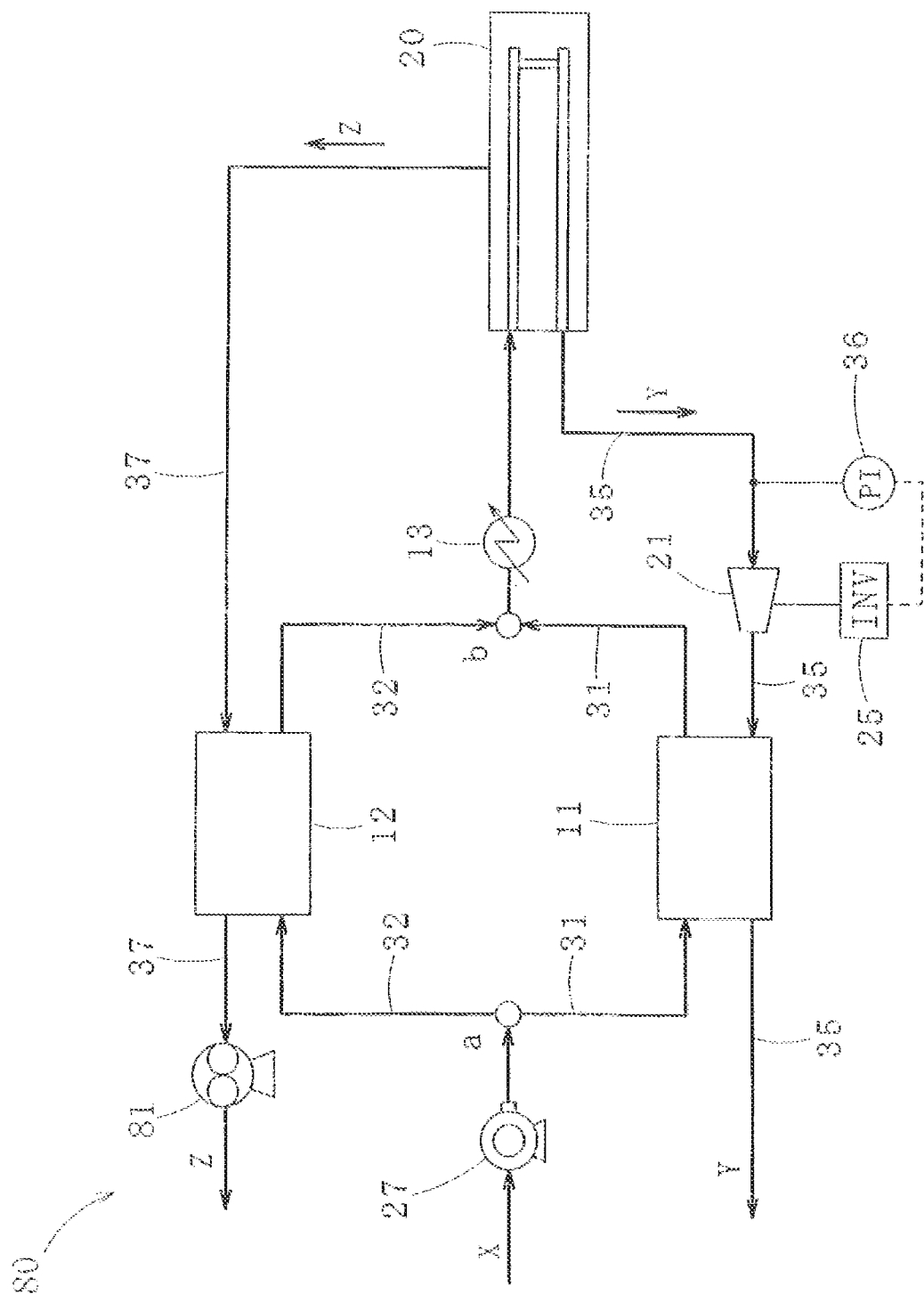
FIG. 6 is a configuration diagram of a membrane separation apparatus according to a fifth embodiment of the present invention.

As shown in FIG. 6, in comparison with the membrane separation apparatus 10, the membrane separation apparatus 80 according to the present embodiment has a configuration such that no second compressor 22 is provided and the fluid Z exiting from the membrane separator 20 is introduced into the second heat exchanger 12 without being adiabatically compressed. In this case, a vacuum, pump 81 is provided on the outlet side of the second heat exchanger 12 for the fluid Z, and the pressure of the membrane permeation is set to be a pressure in accordance with the membrane specification (13 kPaA as an example). Further, the temperature of the ethanol mixed liquid to the supplied to the second heat exchanger 12 by the pump 27 is preferably lower than the temperature at which the vapor exiting from the membrane separator 20 is condensed. As one example, in a case where the pressure of the permeated vapor in the membrane separator 20 is 13 kPaA, condensation thereof occurs at 34° C. Thus, the temperature of the ethanol mixed liquid to be supplied to the second heat exchanger 12 is set to be less than 34° C. (preferably at 25° C.). With the above-described configuration such that the vacuum pump 81 is provided at the outlet side of the second heat exchanger 12 for the fluid z and the temperature of the ethanol mixed liquid is set at a temperature lower than the temperature at which the permeated vapor is condensed, heat exchange utilizing latent heat can be conducted. Further, the vapor is condensed at the second heat exchanger 12 and the volume thereof is therefore significantly reduced. As a result, the motive power of the newly-provided vacuum pump 81 can be kept low. Moreover, since the vapor is not introduced directly into the vacuum pump 81 due to the condensation thereof, it is possible to prevent a failure of the vacuum pump 81 or the like.

The operations of the membrane separation apparatus 80 will be described next.

The ethanol mixed liquid divided at the branch point a and conveyed through the first supply line 31 is heated by the first heat exchanger 11. The heat source therefor is the ethanol vapor adiabatically compressed by the first compressor 21. On the other hand, the ethanol mixed liquid conveyed through the second supply line 32 is heated by the second heat exchanger 12. The heat source therefor is the permeated vapor discharged from the membrane separator 20. As described above, the permeated vapor is condensed so as to conduct heat exchange at the second heat exchanger 12 utilizing the sensible heat and the latent heat. As a result, heat is efficiently recovered also from the permeated vapor having a flow rate smaller than that of the non-permeated side ethanol.

The ethanol mixed liquids heated by the first and second heat exchangers 11 and 12, respectively, are mixed together at the merging point b. If the temperature thereof after the mixing is lower than a predetermined set temperature, the liquid is heated by the third heat exchanger 13. The supplied ethanol vapor heated at the predetermined temperature has the first side pressure ph in accordance wish the membrane specification. The ethanol vapor supplied to the membrane separator 20 is then separated into the ethanol vapor having an increased concentration and the permeated vapor having permeated the membrane and they are separately discharged. The ethanol vapor is adiabatically compressed by the first compressor 21 and then supplied to the first heat exchanger 11 as a heat source. The permeated vapor, on the other hand, is supplied to the second heat exchanger 12 as a heat source.

Also in the thus configured fifth embodiment, the energy consumption in the apparatus as a whole can be reduced in a similar manner to the other embodiments. Note that the temperature of the ethanol mixed liquid may not be necessarily set to 25° C. in the other embodiments since the second compressor 22 is provided. For example, the temperature can be set to 35° C. In other words the temperature of the ethanol mixed liquid to be supplied by the pump 27 is not limited.

Examples

Effects of the membrane separation apparatuses 10, 70, and 80 according to the first, fourth, and fifth embodiments described above will now be described more specifically on the basis of Examples.

With regard to a conventional membrane separation apparatus 90, the membrane separation apparatus 10 according to the first embodiment, the membrane separation apparatus 70 according to the fourth embodiment, and the membrane separation apparatus 80 according to the fifth embodiment, as Comparative Example, Example 1, Example 2, and Example 3, respectively, energy consumptions thereof were obtained by simulations. In the simulations, the conditions of the flow rates and the ethanol concentrations were identical to each other with regard to 1) the ethanol mixed liquid to be supplied to the membrane separation apparatus, 2) the ethanol vapor exiting from the membrane separation apparatus, and 3) the water vapor exiting from the membrane separation apparatus. In other words, in each of the simulations, 1) the flow rate of the ethanol mixed liquid to be supplied to the membrane separation apparatus was set to 24.2 kg/h, and the ethanol concentration thereof was set to 82.7 wt %. Moreover, 2) the flow rate of the ethanol vapor exiting from the membrane separation apparatus was set to 20.4 kg/h, and the ethanol concentration thereof was set to 99.5 wt %. Moreover, 3) the flow rate of the water vapor exiting from the membrane separation apparatus was set to 3.8 kg/h, and the ethanol concentration thereof was set to 13 wt %. Moreover, the separation membrane was a zeolite membrane (membrane area 2.4 $m^2$). The adiabatic efficiency of the compressor and the expander was set to 50%.

Comparative Example

Figure 7:
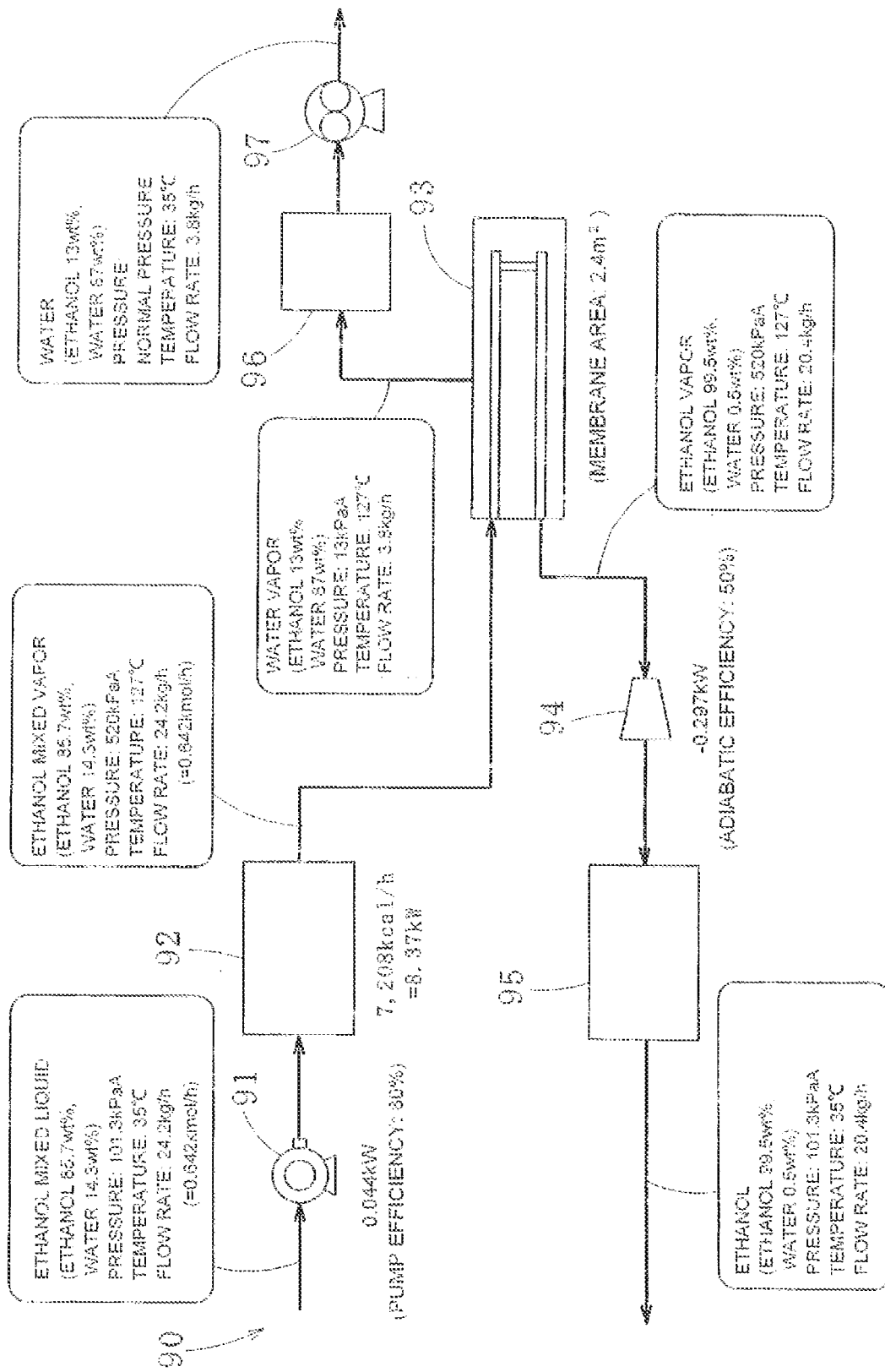
FIG. 7 is a configuration diagram of a conventional membrane separation apparatus according to Comparative Example.

As shown in FIG. 7, in the conventional typical membrane separation apparatus 90, an ethanol mixed liquid sent out by a pump 91 is heated by a heater 92 to be an ethanol mixed vapor and then supplied to a membrane separator 93. The supplied ethanol mixed vapor is separated into an ethanol vapor and a water vapor. The ethanol vapor exiting from the membrane separator 93 is expanded by an expander 94 and cooled by a condenser 95. The water vapor exiting from the membrane separator 93, on the other hand, is cooled by a chiller 96 and compressed by a vacuum pump 97 to be condensed.

In this conventional membrane separation apparatus 90, energy is consumed by the pump 91 and the heater 92. Note that the energy consumption by the vacuum pump 97 is negligible and it is therefore ignored. Moreover, energy is recovered by the expander 94. Respective states of the ethanol mixed liquid, the ethanol mixed vapor, the ethanol vapor, and the water vapor, supplied to the membrane separation apparatus 90 are as shown in FIG. 7. Under the conditions shown in this figure, energy consumptions (in power equivalent) by the devices were simulated as follows.

(1) Pump 91: 0.044 (kW)
(2) Heater 92: 8.37×0.366 (kW)
(3) Expander 94: −0.297 (kW)

Therefore, a sum E1 of the energy consumptions (in power equivalent) is as follows.

$$E1=(0.044+8.37\times0.366-0.297)=2.810 \text{ (kW)}$$

Example 1

In the membrane separation apparatus 10 according to the first embodiment, energy is consumed by the pump 27, the first compressor 21, and the second compressor 22.

Figure 8:
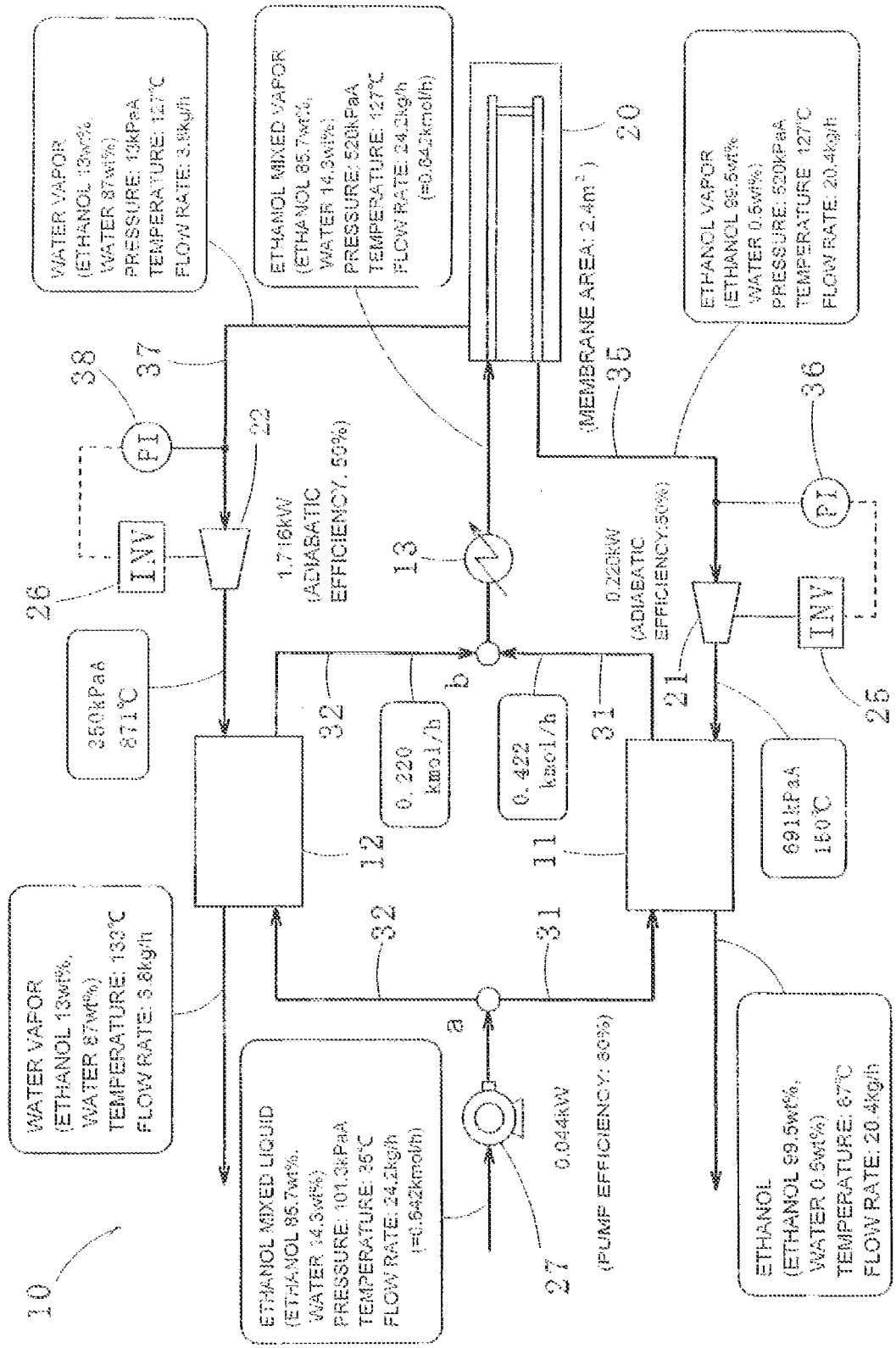
FIG. 8 is a configuration diagram of a membrane separation apparatus according to Example 1 of the present invention.

Respective states of the ethanol mixed liquid, the ethanol mixed vapor, the ethanol vapor, and the water vapor, supplied to the membrane separation apparatus 10, are as shown in FIG. 8. Under the conditions shown in this figure, energy consumptions (in power equivalent) by the devices were simulated as follows.

(1) Pump 27: 0.044 (kW)
(2) First compressor 21: 0.220 (kW)
(3) Second compressor 22: 1.716 (kW)

Therefore, a sum E2 of the energy consumptions is as follows.

$$E2=0.044+0.220+1.716=1.980 \text{ (kW)}$$

In comparison between the present example and Comparative Example, it can be seen that the energy consumption was greatly reduced in the present example.

In the membrane separation apparatus 10, the first and second compressors 21 and 22 are used to raise temperatures and pressures of the ethanol vapor and the water vapor, respectively. Accordingly, the condensation points thereof are raised, thereby efficiently utilizing the latent heat and the sensible heat of these vapors.

As an additional remark, it can be considered that the motive power for the chiller, which was required in the conventional membrane separation apparatus 90, is also unnecessary.

Example 2

In the membrane separation apparatus 70 (during the steady operation thereof) according to the fourth embodiment, energy is consumed by the pump 27, expander 44, the second compressor 22, and the third compressor 43.

Figure 9:
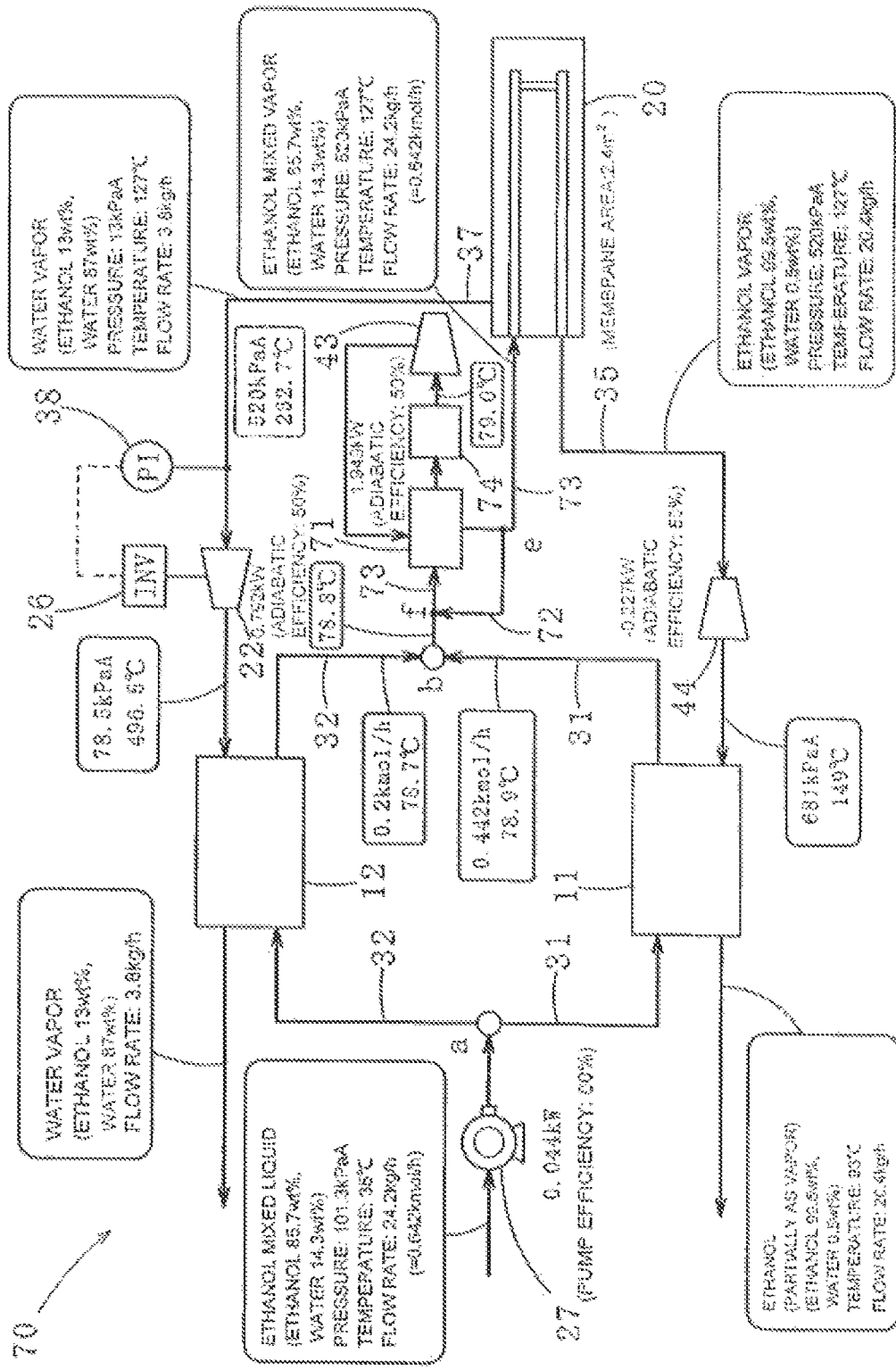
FIG. 9 is a configuration diagram of a membrane separation apparatus according to Example 2 of the present invention.

Respective states of the ethanol mixed liquid, the ethanol mixed vapor, the ethanol vapor, and the water vapor, supplied to the membrane separation apparatus 70, are as shown in FIG. 9. Under the conditions shown in this figure, energy consumptions (in power equivalent) by the devices were simulated as follows.

(1) Pump 27: 0.044 (kW)
(2) Expander 44: −0.227 (kW)
(3) Second compressor 22: 0.792 (kW)
(4) Third compressor 43: 1.949 (kW)

Therefore, a sum E3 of the energy consumption is as follows.

$$E3=0.044-0.227+0.792+1.949=2.558 \text{ (kW)}$$

In comparison between the present example and Comparative Example, it can be seen that the present example has a lower energy consumption.

Example 3

In the membrane separation apparatus 80 according to the fifth embodiment, energy is consumed by the pump 27 and she first compressor 21. For the above-described reason, the energy consumption by the vacuum pump 81 is negligible and it is therefore ignored. With the setting of the ethanol mixed liquid at 25° C., the temperatures of the ethanol after the heat exchange and the permeated vapor (condensed water) are set to 30° C. in the present example.

Figure 10:
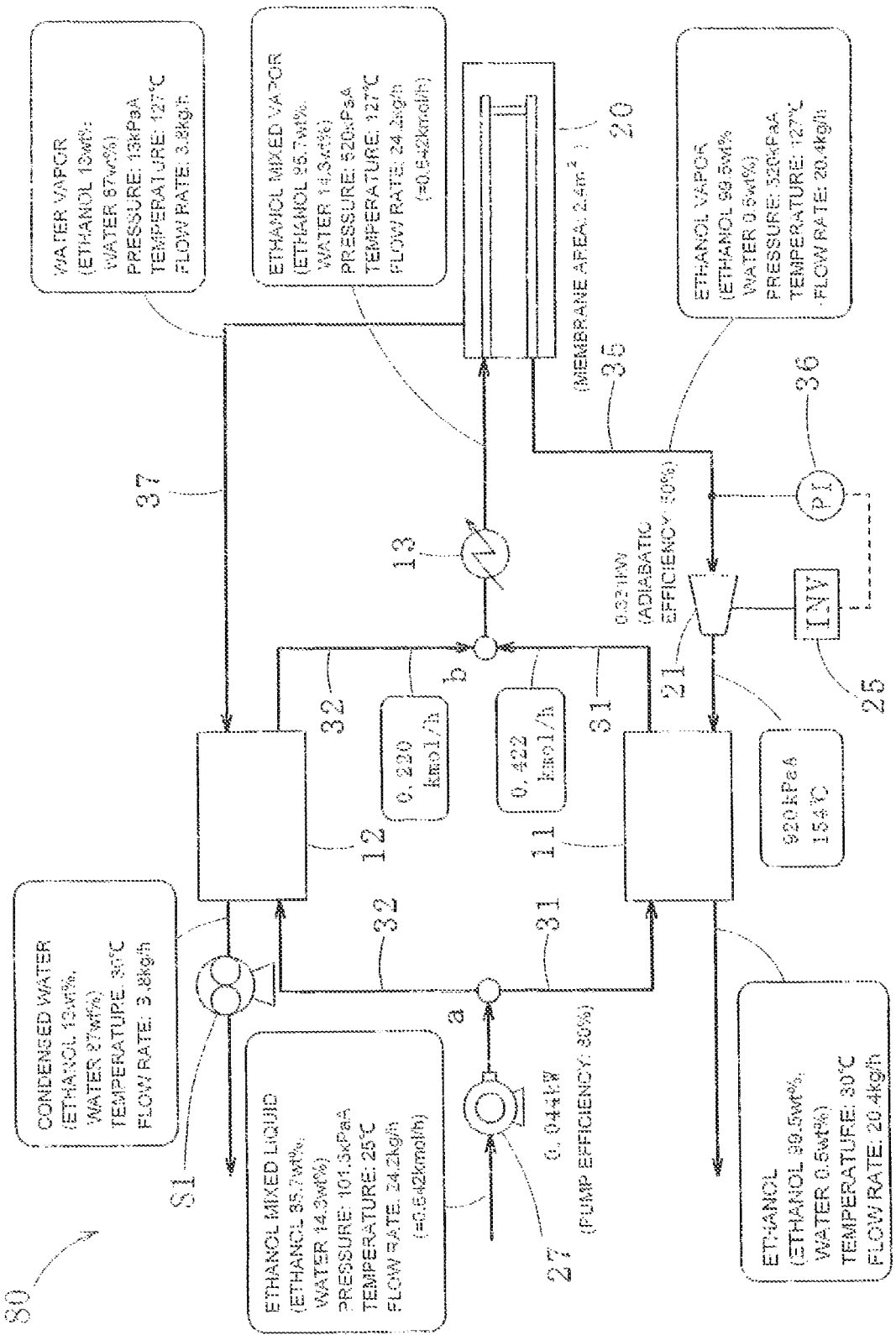
FIG. 10 is a configuration diagram of a membrane separation apparatus according to Example 3 of the present invention.

Respective states of the ethanol mixed liquid, the ethanol mixed vapor, the ethanol vapor, and the water vapor, supplied to the membrane separation apparatus 80, are as shown in FIG. 10. Under the conditions shown in this figure, energy consumptions (in power equivalent) by the devices were simulated as follows.

(1) Pump 27: 0.044 (kW)
(2) First compressor 21: 0.331 (kW)

Therefore, a sum E4 of the energy consumptions is as follows.

$$E4=0.044+0.331=0.375 \text{ (kW)}$$

In comparison between the present example and Comparative Example, it can be seen chat the present example has a lower energy consumption.

Note that the present invention is not limited to the embodiments described above and any change is possible unless it changes the gist of the present invention. For example, a case where the invention is constructed by combining together part of or all of the above-described embodiments and modifications thereof is also included in the technical scope of the present invention.

The pump 27 may be provided as part of the membrane separation apparatus or may be provided outside the membrane separation apparatus.

The membrane separation apparatus is not limited to the separation of ethanol, and it may be applied to the separation of a solvent (for example, isopropanol) used in a semiconductor plant.

The membrane separator is not limited to the one employing the vapor permeation method. Even with a pervaporation method such that a liquid is vaporized and then separated, the membrane separation apparatus can be similarly configured by recovering the latent heat of the permeated side gas and recovering the sensible heat of the non-permeated side liquid.

Moreover, a first heater using an external vapor as a heat source may be provided instead of the first compressor 21, and the ethanol vapor may be subjected to a temperature increase and a pressure increase by the first heater. Further, a second heater using an external vapor as a heat source may be provided instead of the second compressor 22, and the water vapor may be subjected to a temperature increase and a pressure increase by the second heater.

REFERENCE SIGNS LIST

10: membrane separation apparatus, 11: first heat exchanger, 12: second heat exchanger, 13: third heat exchanger, 20: membrane separator, 21: first compressor, 22: second compressor, 25, 26: inverter, 27: pump, 31: first supply line, 32: second supply line, 35: non-permeated side line, 36: pressure sensor, 37: permeated side line, 38: pressure sensor, 40: membrane separation apparatus, 43: third compressor, 44; expander, 50: membrane separation apparatus, 51: first valve, 52: second valve, 61: first temperature sensor, 62: second temperature sensor, 63: third temperature sensor, 64: fourth temperature sensor, 68: control device, 70: membrane separation apparatus, 71: superheater, 72: bypass line, 73: third supply line, 74: cooler, 80: membrane separation apparatus, 81: vacuum pump, 90: membrane separation apparatus, 91; pump, 92: heater, 93: membrane separator, 94; expander, 95: condenser, 96: chiller, 97: vacuum pump

The invention claimed is:

1. A membrane separation method, comprising:
   a step α of separating an ethanol mixed vapor, obtained by vaporizing an ethanol mixed liquid including ethanol and water by a vapor permeation method using a membrane separator, into a fluid Y having a higher ethanol concentration than the ethanol mixed vapor and a fluid Z having a lower ethanol concentration than the ethanol mixed vapor; and a step β of subjecting the fluid Y separated by the step α to a temperature increase and a pressure increase, wherein the ethanol mixed liquid is divided and conveyed by a first supply line and a second supply line; the ethanol mixed liquid divided and conveyed into the first supply line is heat-exchanged with the fluid Y having been subjected to the temperature increase and the pressure increase in the step β in a first heat exchanger disposed in the first supply line, so that the ethanol mixed liquid is turned into the ethanol mixed vapor; the ethanol mixed liquid divided and conveyed into the second supply line is heat-exchanged with the fluid Z in a second heat exchanger disposed in the second supply line, so that the ethanol mixed liquid is turned into the ethanol mixed vapor; and the ethanol mixed vapor flowing through the first supply line and the ethanol mixed vapor flowing through the second supply line are merged and supplied to the membrane separator, if a temperature difference ΔT2 between the ethanol mixed vapor flowing out from the second heat exchanger and flowing through the second supply line and the fluid Z introduced into the second heat exchanger as a heat source is equal to or greater than a reference value TS2, a flow rate of the ethanol mixed liquid conveyed through the first supply line is adjusted to be reduced on the basis of a difference between the temperature difference ΔT2 and the reference value TS2, so as to control an amount of heat to be exchanged at the second heat exchanger, if a temperature difference ΔT1 between the ethanol mixed vapor flowing out from the first heat exchanger and flowing through the first supply line and the fluid Y introduced into the first heat exchanger as a heat source is equal to or greater than a reference value TS1, a flow rate of the ethanol mixed liquid conveyed through the second supply line is adjusted to be reduced on the basis of a difference between the temperature difference ΔT1 and the reference value TS1, so as to control an amount of heat to be exchanged at the first heat exchanger, and when the temperature difference ΔT1 and the temperature difference ΔT2 are equal to or greater than the reference values TS1 and TS2, respectively, the flow rate of the ethanol mixed liquid conveyed through the first supply line is adjusted to be reduced if the temperature difference ΔT2 is greater than the temperature difference ΔT1, while the flow rate of the ethanol mixed liquid conveyed through the second supply line is adjusted to be reduced if the temperature difference ΔT2 is equal to or smaller than the temperature difference ΔT1.

2. The membrane separation method according to claim 1, further comprising a step γ of subjecting the fluid Z exiting from the membrane separator to a temperature increase and a pressure increase, and wherein the ethanol mixed liquid divided and conveyed into the second supply line is heated by heat exchange with the fluid Z having been subjected to the temperature increase and the pressure increase.

3. A membrane separation method, comprising:

a step α of separating an ethanol mixed vapor, obtained by vaporizing an ethanol mixed liquid including ethanol and water by a vapor permeation method using a membrane separator, into a fluid Y having a higher ethanol concentration than the ethanol mixed vapor and a fluid Z having a lower ethanol concentration than the ethanol mixed vapor;

a step ε of expanding the fluid Y separated by the step α; and a step γ of subjecting the fluid Z separated by the step α to a temperature increase and a pressure increase, wherein the ethanol mixed liquid is divided and conveyed by a first supply line and a second supply line; the ethanol mixed liquid divided and conveyed into the first supply line is heat-exchanged with the fluid Y having been expanded in the step ε in a first heat exchanger disposed in the first supply line, so that the ethanol mixed liquid is turned into the ethanol mixed vapor; the ethanol mixed liquid divided and conveyed into the second supply line is heat-exchanged with the fluid Z having been subjected to the temperature increase and the pressure increase in the step γ in a second heat exchanger disposed in the second supply line, so that the ethanol mixed liquid is turned into the ethanol mixed vapor; and the ethanol mixed vapor flowing through the first supply line and the ethanol mixed vapor flowing through the second supply line are merged and supplied to the membrane separator, if a temperature difference ΔT2 between the ethanol mixed vapor flowing out from the second heat exchanger and flowing through the second supply line and the fluid Z introduced into the second heat exchanger as a heat source is equal to or greater than a reference value TS2, a flow rate of the ethanol mixed liquid conveyed through the first supply line is adjusted to be reduced on the basis of a difference between the temperature difference ΔT2 and the reference value TS2, so as to control an amount of heat to be exchanged at the second heat exchanger, if a temperature difference ΔT1 between the ethanol mixed vapor flowing out from the first heat exchanger and flowing through the first supply line and the fluid Y introduced into the first heat exchanger as a heat source is equal to or greater than a reference value TS1, a flow rate of the ethanol mixed liquid conveyed through the second supply line is adjusted to be reduced on the basis of a difference between the temperature difference ΔT1 and the reference value TS1, so as to control an amount of heat to be exchanged at the first heat exchanger, and when the temperature difference ΔT1 and the temperature difference ΔT2 are equal to or greater than the reference values TS1 and TS2, respectively, the flow rate of the ethanol mixed liquid conveyed through the first supply line is adjusted to be reduced if the temperature difference ΔT2 is greater than the temperature difference ΔT1, while the flow rate of the ethanol mixed liquid conveyed through the second supply line is adjusted to be reduced if the temperature difference ΔT2 is equal to or smaller than the temperature difference ΔT1.

4. The membrane separation method according to claim 1, wherein the reference values TS1 and TS2 each are in a range between 2 and 50° C.

5. The membrane separation method according to claim 3, wherein the reference values TS1 and TS2 each are in a range between 2 and 50° C.

* * * * *